US009310614B2

(12) United States Patent  
Yang et al.

(10) Patent No.: US 9,310,614 B2
(45) Date of Patent: Apr. 12, 2016

(54) HEAD MOUNTED DISPLAY AND IMAGING METHOD THEREOF

(71) Applicant: Quanta Computer Inc., Tao Yuan Shien (TW)

(72) Inventors: Wen-CHu Yang, New Taipei (TW); Chung-Te Li, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 95 days.

(21) Appl. No.: 14/151,248

(22) Filed: Jan. 9, 2014

(65) Prior Publication Data

US 2015/0116199 A1   Apr. 30, 2015

(30) Foreign Application Priority Data

Oct. 25, 2013   (TW) .............................. 102138722 A

(51) Int. Cl.
| | |
|---|---|
| *G06F 3/01* | (2006.01) |
| *G02B 27/01* | (2006.01) |
| *G09G 5/00* | (2006.01) |
| *G09G 3/00* | (2006.01) |
| *G02B 27/00* | (2006.01) |

(52) U.S. Cl.
CPC .......... *G02B 27/0172* (2013.01); *G02B 27/017* (2013.01); *G06F 3/013* (2013.01); *G09G 3/003* (2013.01); *G09G 5/003* (2013.01); *G02B 27/0093* (2013.01); *G02B 2027/014* (2013.01); *G02B 2027/0123* (2013.01); *G02B 2027/0132* (2013.01); *G02B 2027/0138* (2013.01); *G02B 2027/0154* (2013.01); *G02B 2027/0178* (2013.01); *G02B 2027/0181* (2013.01)

(58) Field of Classification Search
CPC .......... G06F 3/012; G06F 3/013; G06F 3/01; G02B 27/0093; G02B 27/01; G02B 27/0101; G09G 5/003; G09G 3/003
See application file for complete search history.

(56) References Cited

U.S. PATENT DOCUMENTS

| | | | |
|---|---|---|---|
| 6,433,760 B1 | 8/2002 | Vaissie et al. | |
| 2013/0083003 A1* | 4/2013 | Perez et al. | 345/419 |
| 2013/0083009 A1* | 4/2013 | Geisner et al. | 345/419 |
| 2015/0077312 A1* | 3/2015 | Wang | 345/7 |

FOREIGN PATENT DOCUMENTS

CN           101589327 A    11/2009

* cited by examiner

*Primary Examiner* — MD Saiful A Siddiqui
(74) *Attorney, Agent, or Firm* — Rabin & Berdo, P.C.

(57) ABSTRACT

A head mounted display (HMD) and an imaging method thereof are provided. The HMD comprises a beam splitter, a pico projector, an application processor, an eye image sensor, an adjustment apparatus, an application specific integrated circuit (ASIC), and an eyeglass frame. The application processor controls the pico projector to project a beam. The eye image sensor captures an eye image. The ASIC performs a perspective correction on the eye image to generate a frontal eye image. The ASIC obtains a beam location of the beam and obtains a pupil location according to the frontal eye image. The ASIC according to the beam location and the pupil location controls the adjustment apparatus to adjust the beam splitter. The eyeglass frame carries the beam splitter, the pico projector, the application processor, the eye image sensor and the ASIC.

12 Claims, 8 Drawing Sheets

US 9,310,614 B2

HEAD MOUNTED DISPLAY AND IMAGING METHOD THEREOF

This application claims the benefit of Taiwan application Serial No. 102138722, filed Oct. 25, 2013, the subject matter of which is incorporated herein by reference.

BACKGROUND OF THE INVENTION

1. Field of the Invention

The invention relates in general to an electronic device, and more particularly to a head mounted display (HMD) and an imaging method thereof.

2. Description of the Related Art

Along with the advance in technology, people's absorption of information also increases. Commonly seen electronic devices, such as multimedia play devices, network communication devices and computer devices, display an image on a CRT or LCD display. The number of pixels and size of the image that can be displayed depend on the size and efficiency of the display. Conventional CRT or LCD display is incapable of satisfying the requirements of large size and convenient portability at the same time. To resolve such problem, a head-mounted display (HMD) is currently provided in the market. The HMD has a small tube or liquid crystal display disposed in front of each eye. Based on the 3D effect of parallax between the user's two eyes, the HMD projects the image outputted from respective tube or LCD display on the user's retinas by using a beam splitter.

In a conventional head-mounted display (such as a pair of Google glasses), the location of the beam splitter is fixed and cannot be adjusted, and the user has to adjust his/her viewing direction in order to view the image projected by the pico projector. The conventional HMD is inconvenient to use and easily causes fatigue to the user's eyes.

SUMMARY OF THE INVENTION

The invention is directed to a head mounted display (HMD) and an imaging method thereof.

According to one embodiment of the present invention, a head mounted display (HMD) and an imaging method thereof are provided. The HMD comprises a beam splitter, a pico projector, an application processor, an eye image sensor, an adjustment apparatus, an application specific integrated circuit (ASIC), and an eyeglass frame. The application processor controls the pico projector to project a beam. The eye image sensor captures an eye image. The ASIC performs a perspective correction on the eye image to generate a frontal eye image. The ASIC obtains a beam location of the beam and obtains a pupil location according to the frontal eye image. The ASIC according to the beam location and the pupil location controls the adjustment apparatus to adjust the beam splitter. The eyeglass frame carries the beam splitter, the pico projector, the application processor, the eye image sensor and the ASIC.

According to another embodiment of the present invention, an imaging method of HMD is provided. The imaging method of HMD comprises: projecting a first beam; capturing a first eye image; performing a perspective correction on the first eye image to generate a first frontal eye image; obtaining a first beam location of the first beam, and obtaining a first pupil location according to the first eye image; and adjusting the first beam splitter according to the first beam location and the first pupil location.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
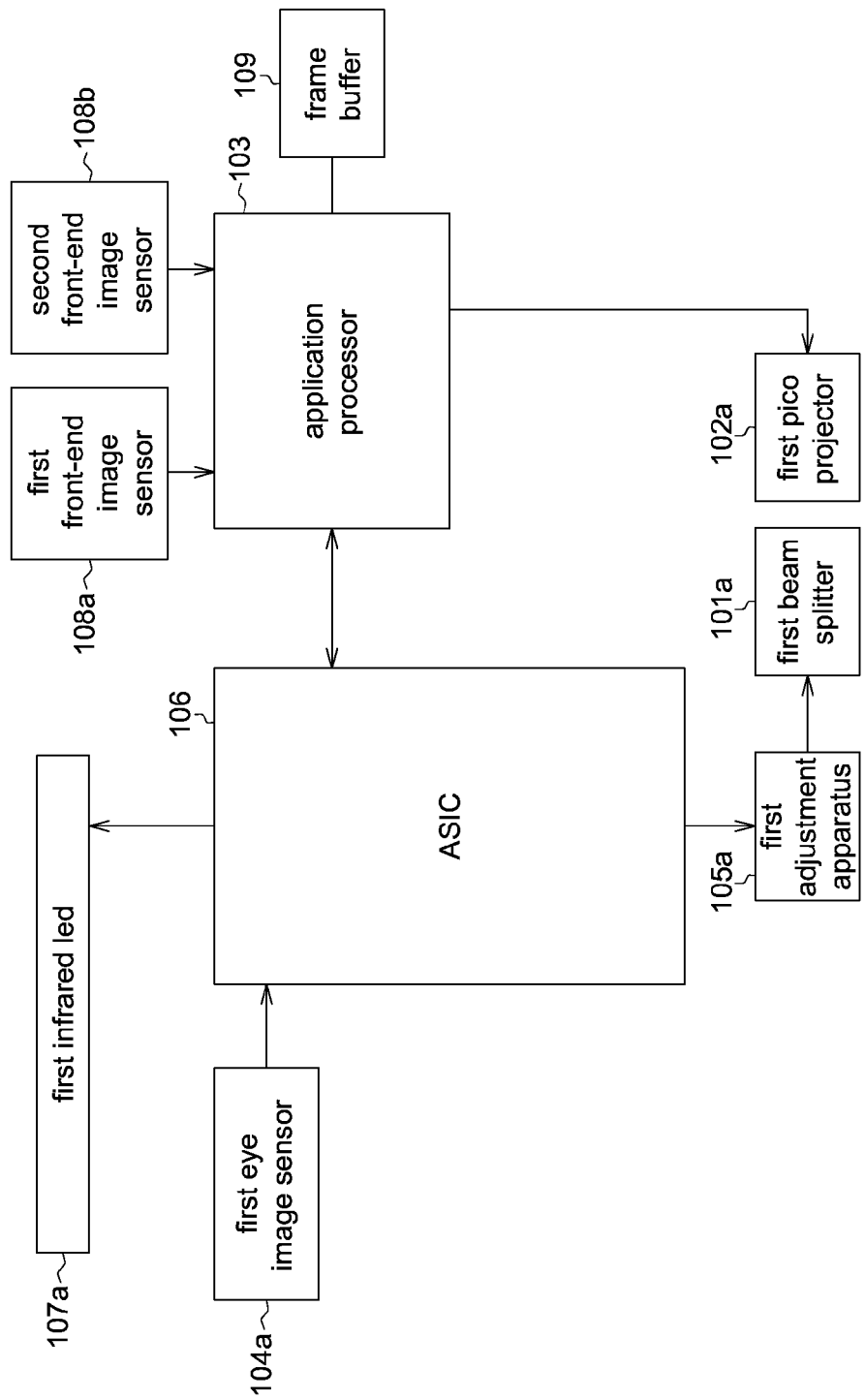
FIG. 1 is a block diagram of an HMD according to the first embodiment.

Referring to FIG. 1, a block diagram of an HMD according to the first embodiment is shown. The HMD 1 comprises a first beam splitter 101a, a first pico projector 102a, an application processor 103, a first eye image sensor 104a, a first adjustment apparatus 105a, an application specific integrated circuit (ASIC) 106, a first infrared LED 107a, a first front-end image sensor 108a, a second front-end image sensor 108b, a frame buffer 109 and an eyeglass frame. The first adjustment apparatus 105a can be realized by such as a motor-driven actuator, a direct current motor, a spring or a sliding rail. The motor-driven actuator comprises a stepper motor, a corresponding gear set and mechanical member, and a motor driver IC. The eyeglass frame carries the first beam splitter 101a, the first pico projector 102a, the application processor 103, the first eye image sensor 104a, the first adjustment apparatus 105a, the ASIC 106, the first infrared LED 107a, the first front-end image sensor 108a, the second front-end image sensor 108b and the frame buffer 109.

The ASIC 106 communicates with the application processor 103 through a universal serial bus (USB). The first front-end image sensor 108a and the second front-end image sensor 108b are connected to the application processor 103, and communicates with the application processor 103 through a mobile interface processor interface (MIPI). The first eye image sensor 104a is connected to the ASIC 106, and communicates with the ASIC 106 through a parallel interface or a MIPI. The first infrared LED 107a is connected to the ASIC 106, and communicates with the ASIC 106 through a general purpose input output (GPIO). The first infrared LED 107a is controlled by the ASIC 106 to provide a first auxiliary light source.

Figure 2:
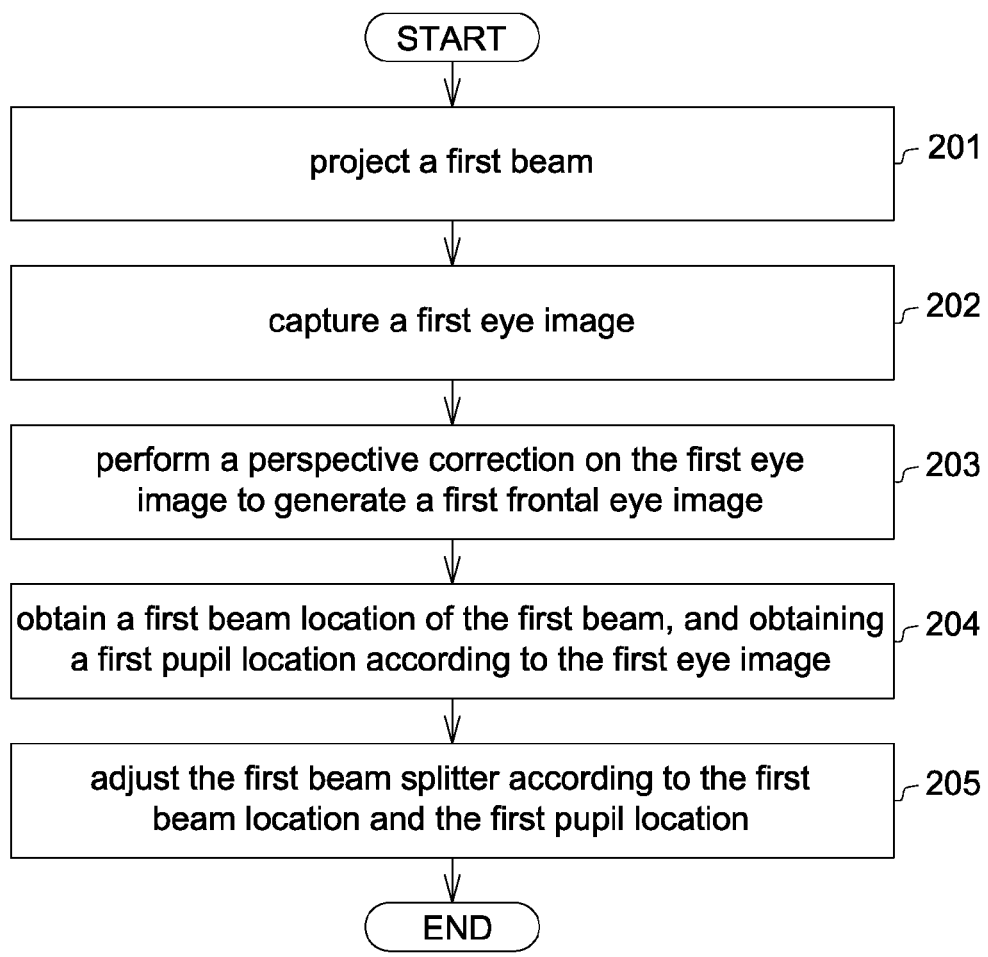
FIG. 2 is a flowchart of an imaging method of HMD according to the first embodiment.

Referring to FIG. 1 and FIG. 2. FIG. 2 is a flowchart of an imaging method of HMD according to the first embodiment. The imaging method of HMD 1 comprises following steps:

Firstly, the method begins at step 201, the application processor 103 controls the first pico projector 102a to project a first beam which corresponds to first image data stored in the frame buffer 109. Next, the method proceeds to step 202, the first eye image sensor 104a captures a first eye image such as a left eye or right eye image of the user.

Then, the method proceeds to step 203, the ASIC 106 performs a perspective correction on the first eye image to generate a first frontal eye image. Then, the method proceeds to step 204, the ASIC 106 obtains a first beam location of the first beam, and obtains a first pupil location according to the first frontal eye image, wherein the first beam location is determined according to the disposition of the first beam splitter 101a and the first adjustment apparatus 105a. In another embodiment, before the first pupil location is obtained, an eye detection can be performed to avoid capturing an eye blinking image and affecting subsequent analysis. Then, the method proceeds to step 205, the ASIC 106 controls the first adjustment apparatus 105a to adjust the first beam splitter 101a according to the first beam location and the first pupil location. The first adjustment apparatus 105a adjusts the first beam splitter 101a until the first beam location matches the first pupil location. Since the first beam location can be dynamically adjusted along with the first pupil location, the user does not need to adjust his/her viewing direction, largely improving operation convenience.

For instance, the first adjustment apparatus 105a rotates the first beam splitter 101a or horizontally moves the first beam splitter 101a, so that the first beam location matches the first pupil location. When the first beam location matches the first pupil location, the ASIC 106 outputs the first pupil location and the location and angle of the first beam splitter 101a to the application processor 103. The application processor 103 further controls the first front-end image sensor 108a or the second front-end image sensor 108b according to the first pupil location, so that the image captured by the first front-end image sensor 108a or the second front-end image sensor 108b matches the user's viewing direction. In addition, the application processor 103 can further assist the first front-end image sensor 108a or the second front-end image sensor 108b to calculate auto exposure (AE) according to the first pupil location. Besides, the application processor 103 can further adjust the first image data stored in the frame buffer 109 according to the first pupil location. For instance, the application processor 103 performs view synthesis and compensation on the first image data according to the first pupil location. In subsequent process, the adjusted first image data is projected so as to achieve best 3D visual projection.

Second Embodiment

Figure 3:
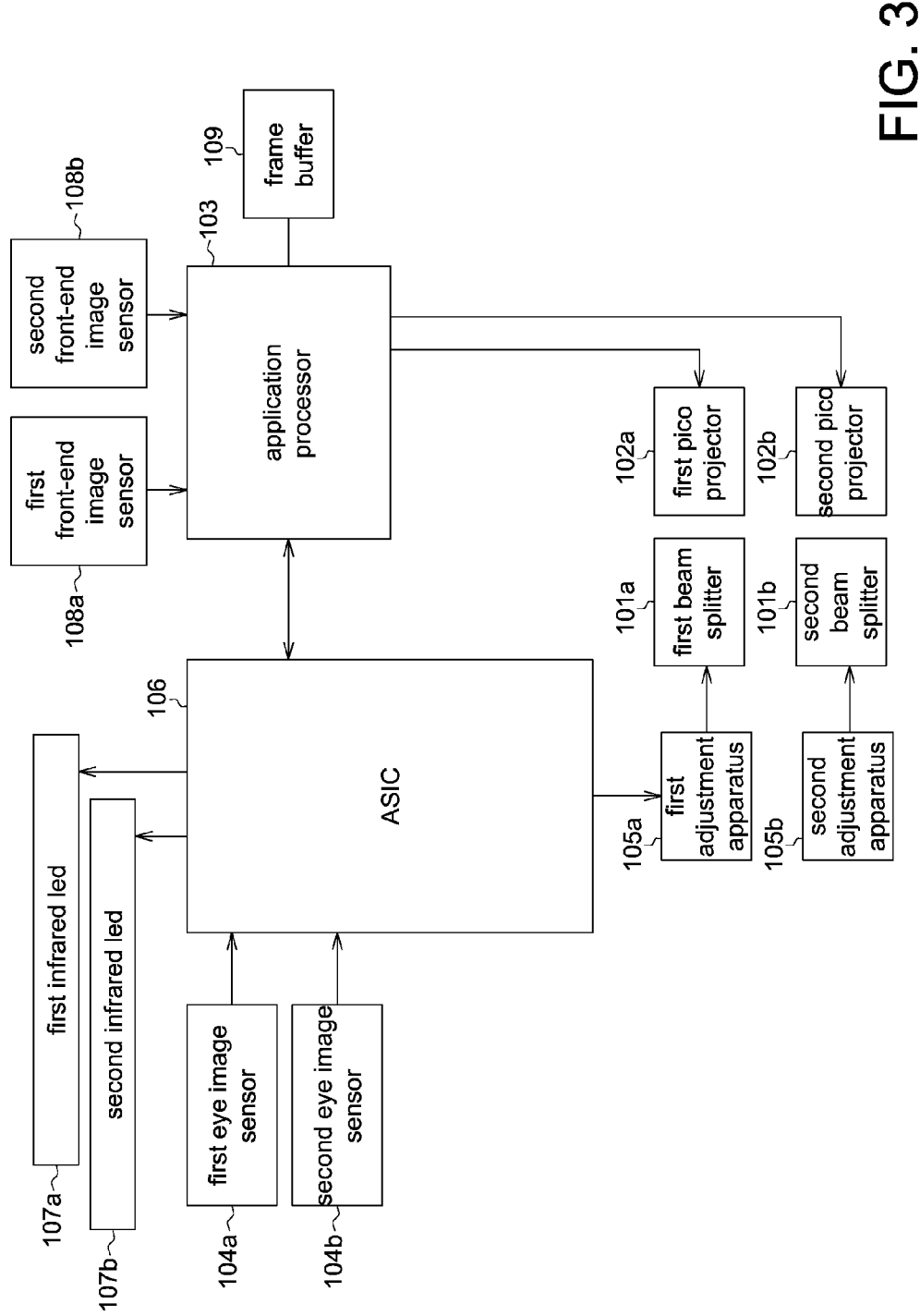
FIG. 3 is a block diagram of an HMD according to the second embodiment.

Referring to FIG. 3, a block diagram of an HMD according to the second embodiment is shown. The second embodiment is different from the first embodiment mainly in that the HMD 3 further comprises a second beam splitter 101b, a second adjustment apparatus 105b, a second pico projector 102b, a second eye image sensor 104b and a second infrared LED 107b in addition to the first beam splitter 101a, the first pico projector 102a, the application processor 103, the first eye image sensor 104a, the first adjustment apparatus 105a, the ASIC 106, the first infrared LED 107a, the first front-end image sensor 108a, the second front-end image sensor 108b, the frame buffer 109 and the eyeglass frame. The eyeglass frame further carries the second beam splitter 101b, the second pico projector 102b, the second eye image sensor 104b, the second adjustment apparatus 105b, and the second infrared LED 107b. The first infrared LED 107a is controlled by the ASIC 106 to provide a first auxiliary light source. The second infrared LED 107b is controlled by the ASIC 106 to provide a second auxiliary light source.

Figure 4:
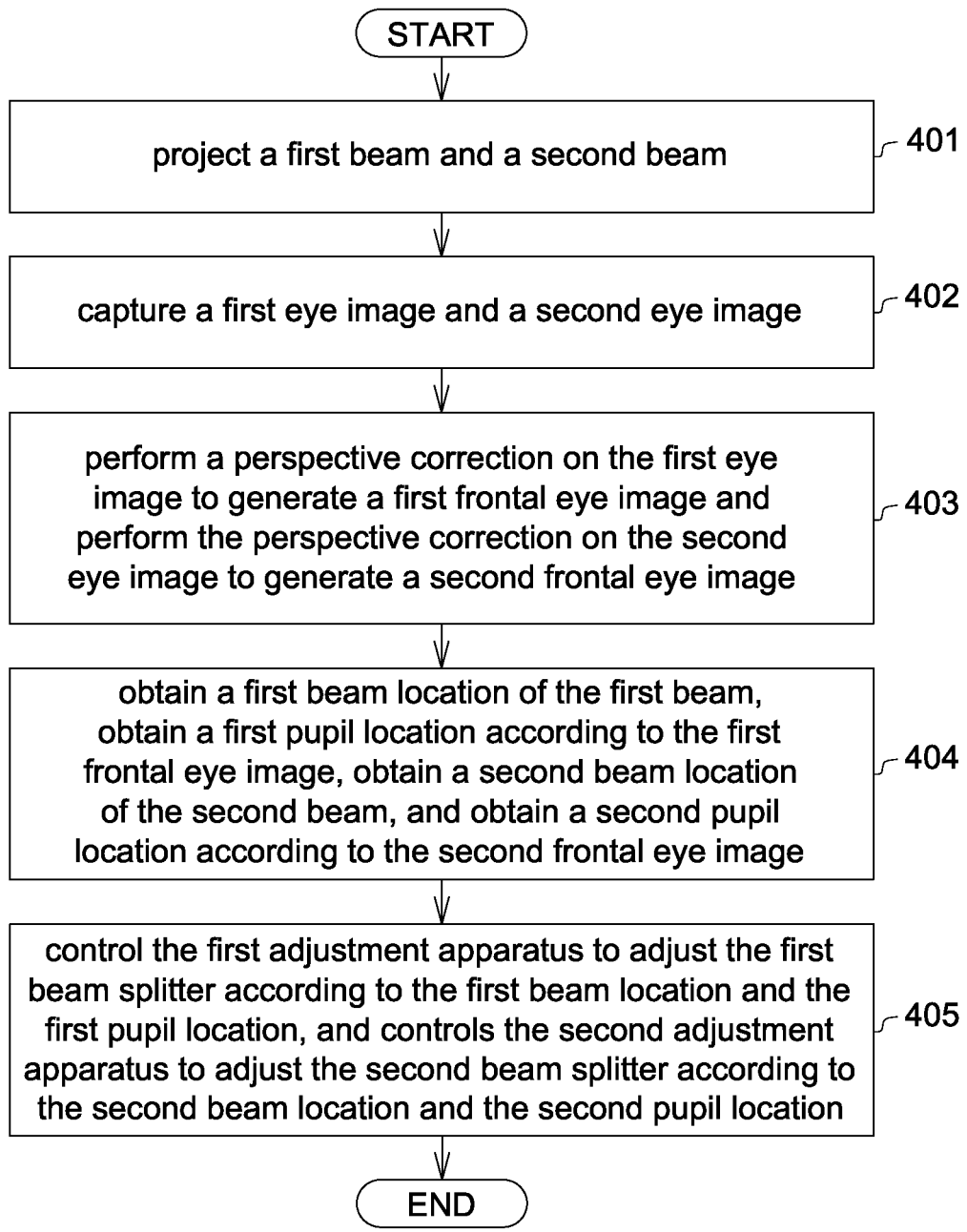
FIG. 4 is a flowchart of an imaging method of HMD according to the second embodiment.

Referring to FIG. 3 and FIG. 4. FIG. 4 is a flowchart of an imaging method of HMD according to the second embodiment. Firstly, the method begins at step 401, the application processor 103 controls the first pico projector 102a to project a first beam, and the application processor 103 controls the second pico projector 102b projects a second beam, wherein the first beam corresponds to first image data stored in the frame buffer 109, and the second beam corresponds to second image data stored in the frame buffer 109. Next, the method proceeds to step 402, the first eye image sensor 104a captures a first eye image, and the second eye image sensor 104b captures a second eye image. For instance, the first eye image is the user's right eye image and the second eye image is the user's left eye image. Or, the first eye image is the user's left eye image and the second eye image is the user's right eye image.

Then, the method proceeds to step 403, the ASIC 106 performs a perspective correction on the first eye image to generate a first frontal eye image, and performs the perspective correction on the second eye image to generate a second frontal eye image. Then, the method proceeds to step 404, the ASIC 106 obtains a first beam location of the first beam, obtains a first pupil location according to the first frontal eye image, obtains a second beam location of the second beam, and obtains a second pupil location according to the second frontal eye image, wherein the second beam location is determined according to the disposition of the second beam splitter 101b and the second adjustment apparatus 105b. In another embodiment, before the second pupil location is obtained, an eye detection can be performed to avoid capturing an eye blinking image and affecting subsequent analysis. Then, the method proceeds to step 405, the ASIC 106 controls the first adjustment apparatus 105a to adjust the first beam splitter 101a according to the first beam location and the first pupil location, and controls the second adjustment apparatus 105b to adjust the second beam splitter 101b according to the second beam location and the second pupil location. The first adjustment apparatus 105a adjusts the first beam splitter 101a until the first beam location matches the first pupil location. Similarly, the second adjustment apparatus 105b adjusts the second beam splitter 101b until the second beam location matches the second pupil location. Since the first beam location and the second beam location can be dynamically adjusted along with the first pupil location and the second pupil location, the user does not need to adjust his/her viewing direction, largely improving operation convenience.

When the ambient light turns too dark, the ASIC 106 turns on the first infrared LED 107a to provide a first auxiliary light source and turns on the second infrared LED 107b to provide a second auxiliary light source. The second adjustment apparatus 105b can rotate or horizontally move the second beam splitter 101b, so that the second beam location matches the second pupil location. When the second beam location matches the second pupil location, the ASIC 106 outputs the second pupil location and the location and angle of the second beam splitter 101b to the application processor 103.

The application processor 103 can further control the first front-end image sensor 108a or the second front-end image sensor 108b according to the first pupil location and the second pupil location. Furthermore, the application processor 103 can further assist the first front-end image sensor 108a and the second front-end image sensor 108b to calculate auto exposure (AE) according to the first pupil location and the second pupil location. Besides, the application processor 103 can further adjust the first image data and the second image data stored in the frame buffer 109 according to the first pupil location and the second pupil location. For instance, the application processor 103 performs view synthesis and compensation on the first image data and the second image data according to the first pupil location and the second pupil location.

Third Embodiment

Figure 5:
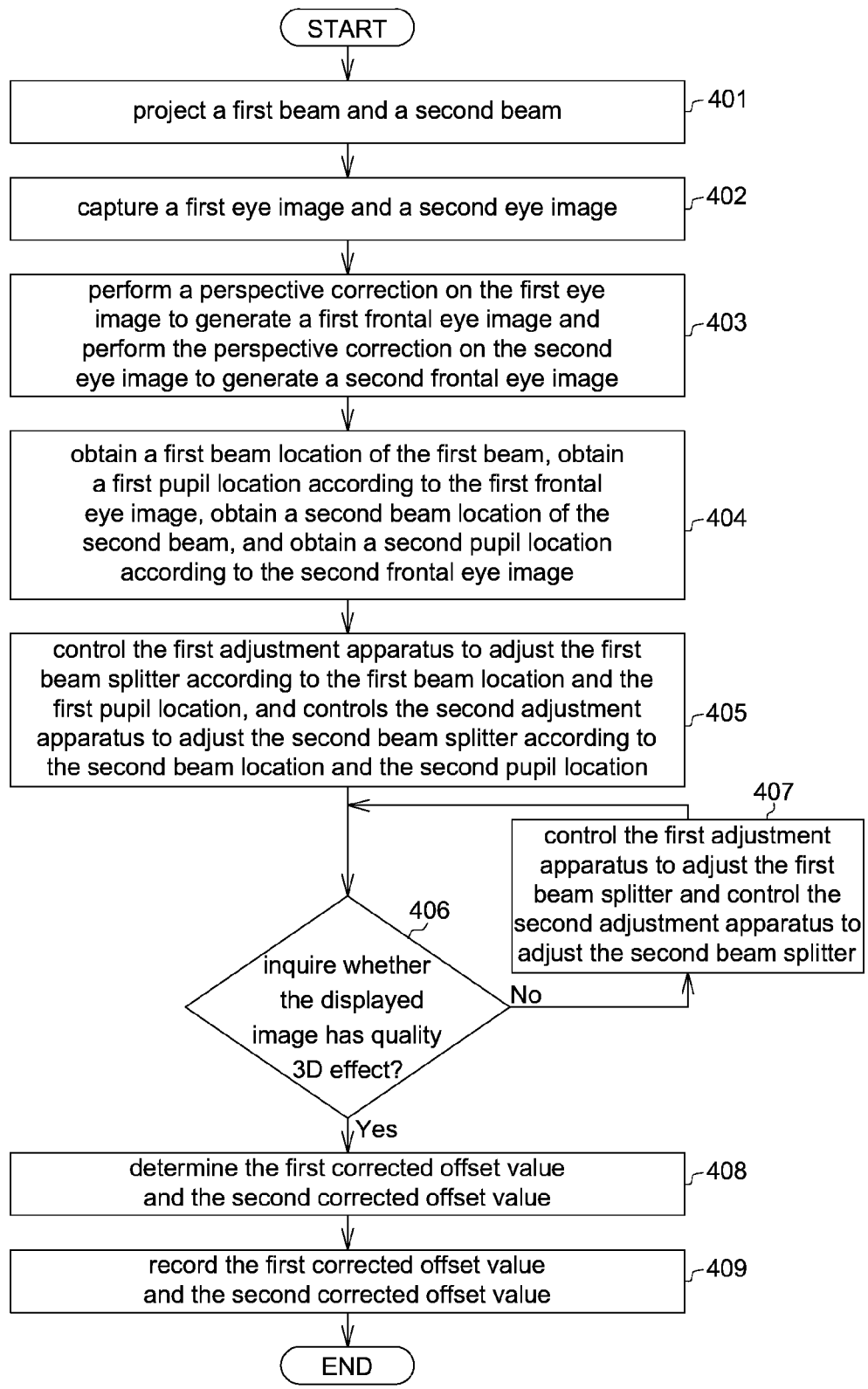
FIG. 5 is a flowchart of an imaging method of HMD according to the third embodiment.

Referring to FIG. 3 and FIG. 5. FIG. 5 is a flowchart of an imaging method of HMD according to the third embodiment. The third embodiment is different from the second embodiment mainly in that the third embodiment can further performs correction to provide best 3D visual effect according to the user's actual perspective. When the first beam location matches the first pupil location and the second beam location matches the second pupil location, best 3D visual effect should be achieved in terms of physical aspect. To avoid an individual's biological differences affecting best 3D visual effect, the third embodiment finds a first corrected offset value and a second corrected offset value corresponding to the user's two eyes according to the flowchart of FIG. 5. The application processor 103 and the ASIC 106 perform correction to provide best 3D visual effect according to the first corrected offset value and the second corrected offset value.

In addition to steps 401 to 405, the imaging method of the third embodiment further comprising steps 406 to 409. In step 405, the first adjustment apparatus 105a adjusts the first beam splitter 101a until the first beam location matches the first pupil location, and the second adjustment apparatus 105b adjusts the second beam splitter 101b until the second beam location matches the second pupil location. In step 406, the ASIC 106 requests the application processor 103 to send an inquiring message to inquire whether the displayed image has quality 3D effect. If the displayed image does not have quality 3D effect, then the method performs step 407. In step 407, the ASIC 106 controls the first adjustment apparatus 105a to adjust the first beam splitter 101a and controls the second adjustment apparatus 105b to adjust the second beam splitter 101b.

Then, the method performs step 406 again, the ASIC 106 requests the application processor 103 to send an inquiring message to inquire whether the displayed image has quality 3D effect. If the displayed image has quality 3D effect, then the method performs step 408. In step 408, the ASIC 106 determines the first corrected offset value and the second corrected offset value according to the first beam splitter 101a and the second beam splitter 101b. Then, the method proceeds to step 409, the application processor 103 records the first corrected offset value and the second corrected offset value. The first corrected offset value may be equivalent to or different from the second corrected offset value. When the first corrected offset value is equivalent to the second corrected offset value, the application processor 103 only needs to record one of the first corrected offset value and the second corrected offset value. In other words, when the adjusted first beam location only differs with the first pupil location by the first corrected offset value and the adjusted second beam location differs with the second pupil location by the second corrected offset value, the user will perceive quality 3D image.

Through the above correction process, the user obtains multiple sets of first corrected offset value and second corrected offset value. For instance, the user can obtain a set of first corrected offset value and second corrected offset value when wearing myopia or hyperopia lens, and can obtain another set of first corrected offset value and second corrected offset value when not wearing myopia or hyperopia lens.

Fourth Embodiment

Figure 6:
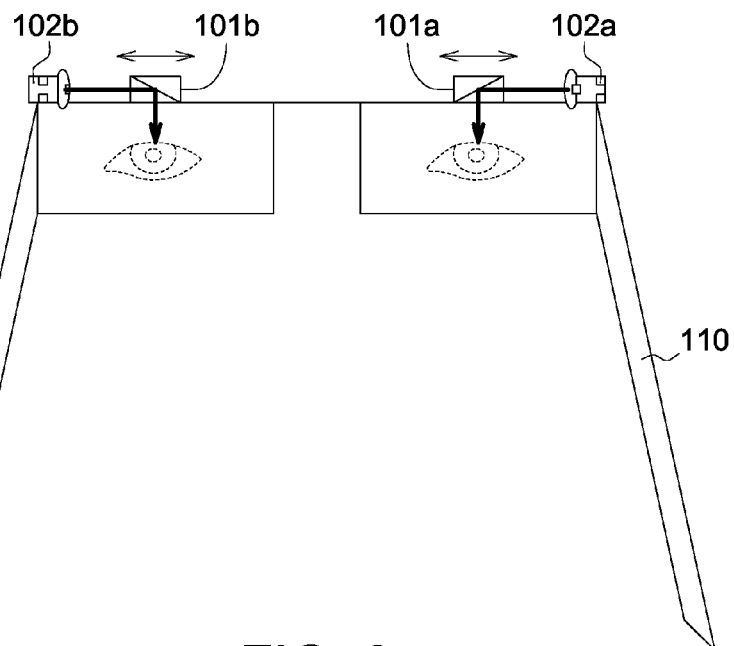
FIG. 6 is an appearance diagram of an HMD according to the fourth embodiment.

Referring to FIG. 3 and FIG. 6. FIG. 6 is an appearance diagram of an HMD according to the fourth embodiment. In the fourth embodiment, the first pico projector 102a of the HMD 6a is disposed at the right-hand side of the eyeglass frame 110, and the second pico projector 102b is disposed at the left-hand side of the eyeglass frame 110. The first beam splitter 101a and the second beam splitter 101b are disposed above the eyeglass frame 110 and can be moved horizontally.

Fifth Embodiment

Figure 7:
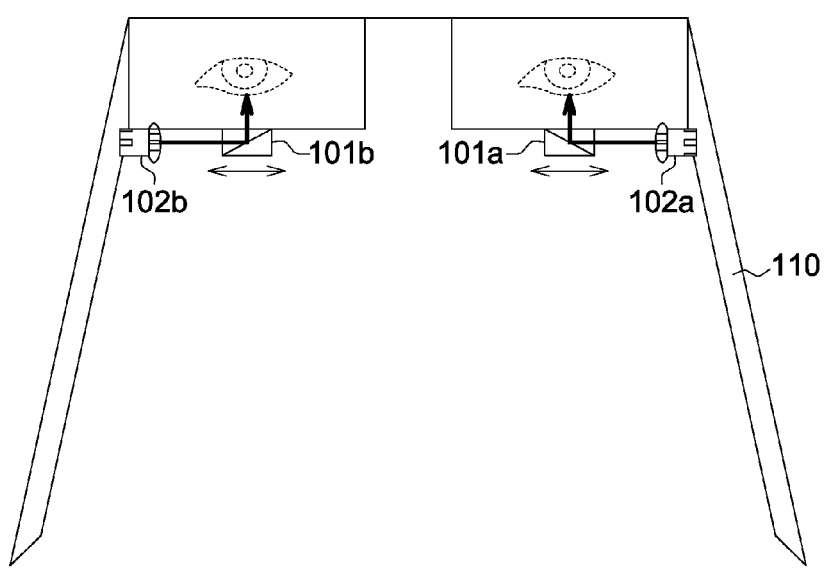
FIG. 7 is an appearance diagram of an HMD according to the fifth embodiment.

Referring to FIG. 3 and FIG. 7. FIG. 7 is an appearance diagram of an HMD according to the fifth embodiment. In the fifth embodiment, the first pico projector 102a of the HMD 6b is disposed at the right-hand side of the eyeglass frame 110, and the second pico projector 102b is disposed at the left-hand side of the eyeglass frame 110. The first beam splitter 101a and the second beam splitter 101b are disposed under the eyeglass frame 110 and can be moved horizontally.

Sixth Embodiment

Figure 8:
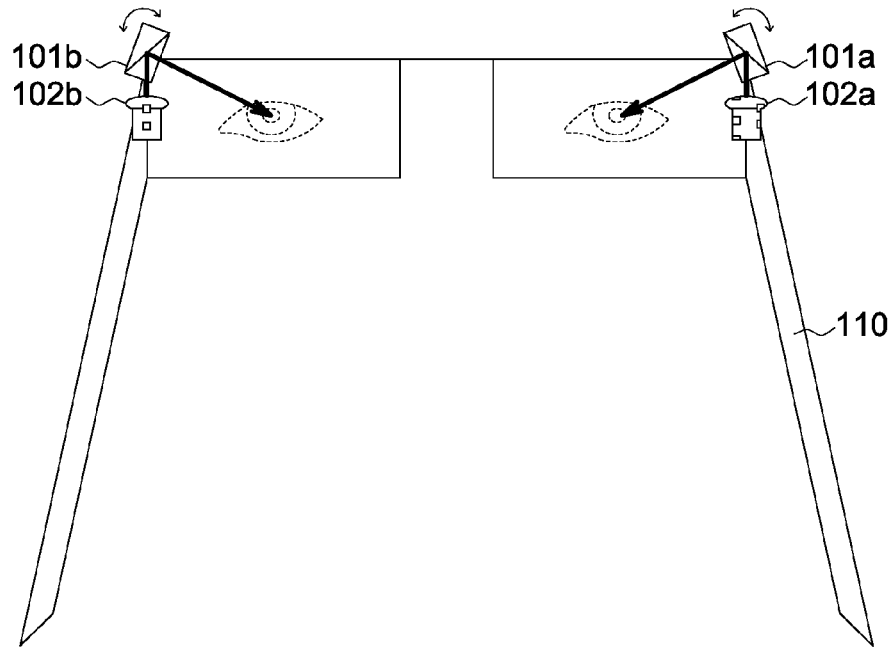
FIG. 8 is an appearance diagram of an HMD according to the sixth embodiment.

Referring to FIG. 3 and FIG. 8. FIG. 8 is an appearance diagram of an HMD according to the sixth embodiment. In the sixth embodiment, the first pico projector 102a of the HMD 6c is disposed at the top right corner of the eyeglass frame 110, and the second pico projector 102b is disposed at the top left corner of the eyeglass frame 110. The first beam splitter 101a and the second beam splitter 101b are disposed above the eyeglass frame 110 and are rotatable.

Seventh Embodiment

Figure 9:
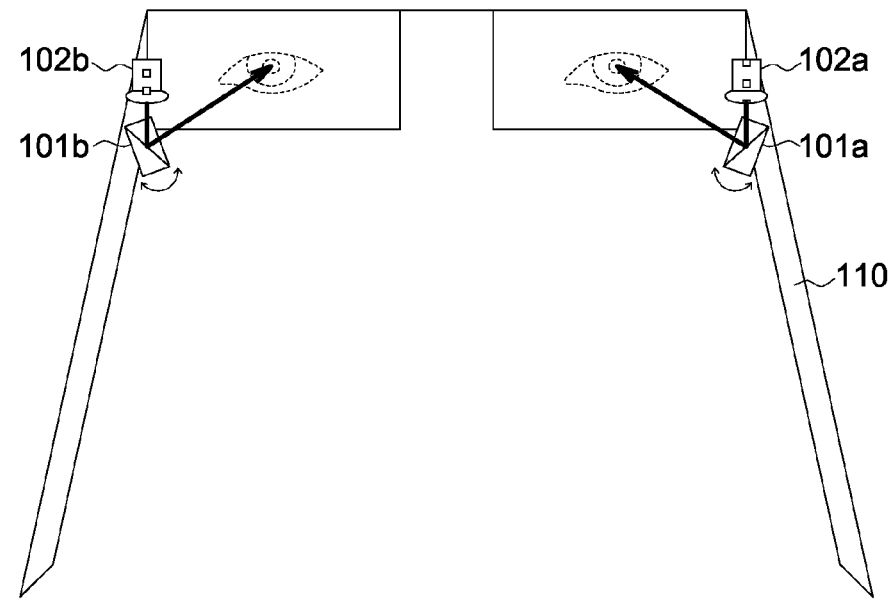
FIG. 9 is an appearance diagram of an HMD according to the seventh embodiment.

Referring to FIG. 3 and FIG. 9. FIG. 9 is an appearance diagram of an HMD according to the seventh embodiment. In the seventh embodiment, the first pico projector 102a of the HMD 6d is disposed at the bottom right corner of the eyeglass frame 110, and the second pico projector 102b is disposed at the bottom left corner of the eyeglass frame 110. The first beam splitter 101a and the second beam splitter 101b are disposed under the eyeglass frame 110 and are rotatable.

Eighth Embodiment

Figure 10:
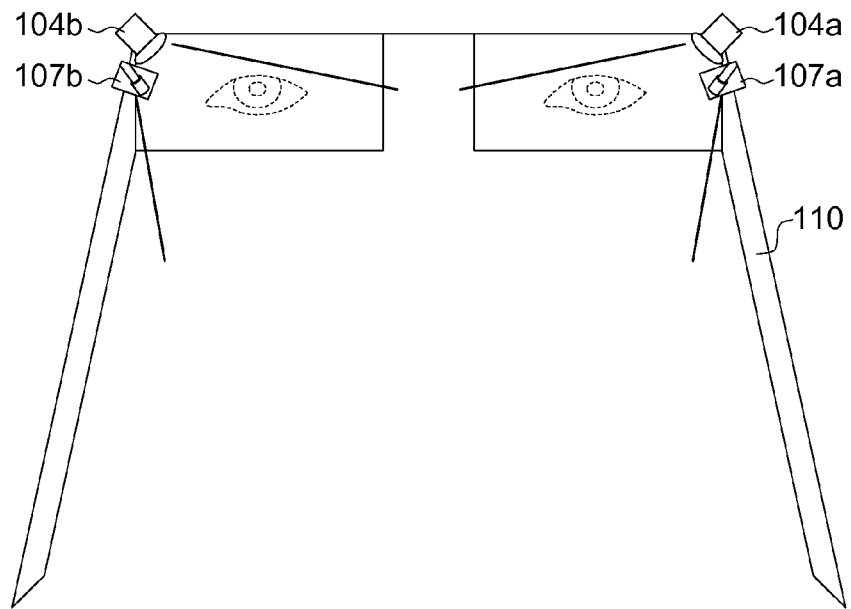
FIG. 10 is an appearance diagram of an HMD according to an eighth embodiment.

Referring to FIG. 3 and FIG. 10. FIG. 10 is an appearance diagram of an HMD according to an eighth embodiment. In the eighth embodiment, the first eye image sensor 104a of the HMD 6e is disposed at the top right corner of the eyeglass frame 110, and the second eye image sensor 104b is disposed at the top left corner of the eyeglass frame 110. The first infrared LED 107a and the first eye image sensor 104a are adjoining to each other, and provide a first auxiliary light source. The second infrared LED 107b and the second eye image sensor 104b are adjoining to each other and provide a second auxiliary light source.

Ninth Embodiment

Figure 11:
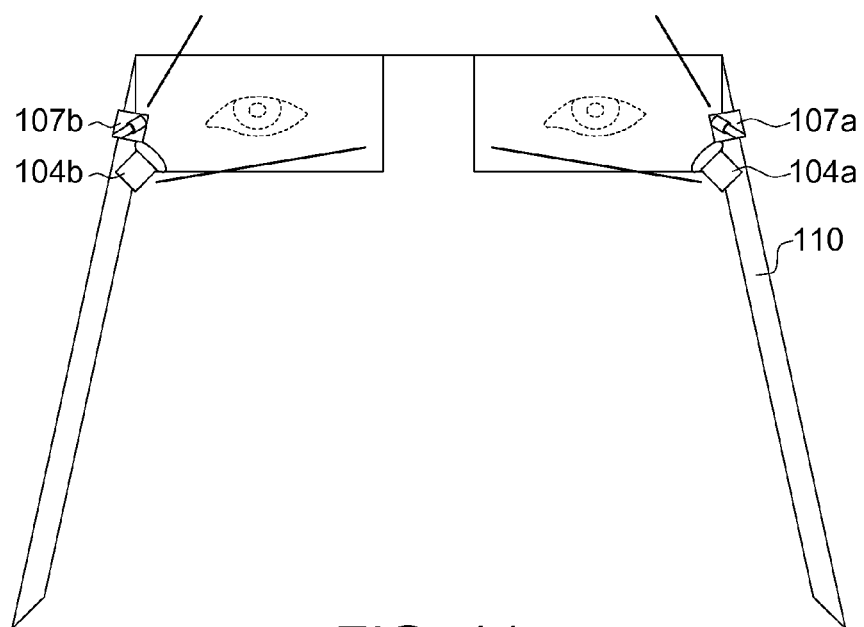
FIG. 11 is an appearance diagram of an HMD according to the ninth embodiment.

Referring to FIG. 3 and FIG. 11. FIG. 11 is an appearance diagram of an HMD according to the ninth embodiment. In the ninth embodiment, the first eye image sensor 104a of the HMD 6f is disposed at the bottom right corner of the eyeglass frame 110, and the second eye image sensor 104b is disposed at the bottom left corner of the eyeglass frame 110. The first infrared LED 107a and the first eye image sensor 104a are adjoining to each other, and provide a first auxiliary light source. The second infrared LED 107b and the second eye image sensor 104b are adjoining to each other, and provide a second auxiliary light source.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A head mounted display (HMD), comprising:
    A first beam splitter;
    a first pico projector;
    an application processor for controlling the first pico projector to project a first beam; a first eye image sensor for capturing a first eye image; a first adjustment apparatus;
    an application specific integrated circuit (ASIC) for performing a perspective correction on the first eye image to generate a first frontal eye image, wherein the ASIC obtains a first beam location of the first beam and obtains a first pupil location according to the first frontal eye image and controls the first adjustment apparatus to adjust the first beam splitter according to the first beam location and the first pupil location;
    an eyeglass frame for carrying the first beam splitter, the first adjustment apparatus, the first pico projector, the application processor, the first eye image sensor and the ASIC;
    a second beam splitter;
    a second adjustment apparatus for adjusting the second beam splitter;
    a second pico projector, wherein the application processor controls the second pico projector to project a second beam; and
    a second eye image sensor for capturing a second eye image;
    wherein when the first beam location matches the first pupil location and the second beam location matches the second pupil location, the ASIC requests the application processor to send an inquiring message to inquire whether a displayed image has a quality 3D effect, whenever the displayed image does not have the quality 3D effect, the ASIC controls the first adjustment apparatus to adjust the first beam splitter and controls the second adjustment apparatus to adjust the second beam splitter, and whenever the displayed image does have the quality 3D effect, the ASIC determines a first corrected offset value and a second corrected offset value according to the adjusted first beam splitter and the second beam splitter, and records the first corrected offset value and the second corrected offset value.

2. The HMD according to claim 1, further comprising:
    a frame buffer for storing a first image data corresponding to the first beam, wherein the ASIC outputs the first pupil location to the application processor which adjusts the first image data according to the first pupil location.

3. The HMD according to claim 1, wherein the ASIC performs the perspective correction on the second eye image to generate a second frontal eye image, obtains a second beam location of the second beam, obtains a second pupil location according to the second frontal eye image, and controls the second adjustment apparatus to adjust the second beam splitter according to the second beam location and the second pupil location.

4. The HMD according to claim 1, further comprising:
    a frame buffer for storing first image data corresponding to the first beam and second image data corresponding to the second beam, wherein the ASIC adjusts the first image data and the second image data according to the first pupil location and the second pupil location.

5. The HMD according to claim 1, further comprising:
    a first infrared LED controlled by the ASIC to provide a first auxiliary light source; and
    a second infrared LED controlled by the ASIC to provide a second auxiliary light source.

6. The HMD according to claim 1, wherein the first adjustment apparatus horizontally moves the first beam splitter.

7. The HMD according to claim 1, wherein the first adjustment apparatus rotates the first beam splitter.

8. An imaging method of head mounted display (HMD), comprising:
    projecting a first beam;
    capturing a first eye image;
    performing a perspective correction on the first eye image to generate a first frontal eye image;
    obtaining a first beam location of the first beam and obtaining a first pupil location according to the first eye image;
    adjusting a first beam splitter according to the first beam location and the first pupil location;
    projecting a second beam to a second beam location;
    capturing a second eye image;
    performing the perspective correction on the second eye image to generate a second frontal eye image;
    obtaining a second pupil location according to the second frontal eye image;
    adjusting a second beam splitter according to the second beam location and the second pupil location;
    sending an inquiring message to inquire whether a displayed image has a quality 3D effect when the first beam location matches the first pupil location and the second beam location matches the second pupil location;
    adjusting the first beam splitter and the second beam splitter whenever the displayed image does not have the quality 3D effect; and
    determining a first corrected offset value and a second corrected offset value according to the adjusted first beam splitter and the second beam splitter, and recording the first corrected offset value and the second corrected offset value whenever the displayed image does have the quality 3D effect.

9. The imaging method according to claim 8, further comprising:
    adjusting a first image data corresponding to the first beam according to the first pupil location.

10. The imaging method according to claim 8, further comprising:
    adjusting first image data corresponding to the first beam and second image data corresponding to the second beam according to the first pupil location and the second pupil location.

11. The imaging method according to claim 8, wherein the first beam splitter is horizontally moved in the adjustment step.

12. The imaging method according to claim 8, wherein the first beam splitter is rotated in the adjustment step.

* * * * *